United States Patent
Bricaud et al.

[11] Patent Number: 6,120,328
[45] Date of Patent: Sep. 19, 2000

[54] THIN SMART CARD CONNECTOR

[75] Inventors: Herve'Guy Bricaud, Dole; Fabrice Valcher, Damparis, both of France

[73] Assignee: ITT Manufacturing Enterprises, Inc., Wilmington, Del.

[21] Appl. No.: 09/503,756

[22] Filed: Feb. 14, 2000

Related U.S. Application Data

[63] Continuation of application No. 09/218,118, Dec. 21, 1998, Pat. No. 6,053,776.

[30] Foreign Application Priority Data

Dec. 26, 1997 [FR] France .................................. 97 165565

[51] Int. Cl.[7] ..................................................... H01R 24/00
[52] U.S. Cl. ........................ 439/630; 439/862; 439/733.1
[58] Field of Search ................................ 439/630, 733.1, 439/751, 862, 60

[56] References Cited

U.S. PATENT DOCUMENTS 3,933,405  1/1976  Patterson, Jr. et al. ................. 439/862
5,882,230  3/1999  Bricaud et al. .......................... 439/630

*Primary Examiner*—Paula Bradley
*Assistant Examiner*—Tho D. Ta
*Attorney, Agent, or Firm*—Thomas L. Peterson

[57] ABSTRACT

A thin electrical connector for connecting to contact pads of a smart card, includes contacts (44) and a support plate (42) that holds the contacts on a circuit board (16), where the contacts and plate are thin. Each contact has a contact blade (60) that projects at an upward incline through and above a slot (52) in the support plate, and each contact has a rear portion (61) for mounting. The rear portion includes a mount part (66) joined to the blade and a pair of retainers (80) on laterally opposite sides of the mount portion. The retainers have ears (104,118) lying out of the plane of the mount part The support plate has a downwardly-opening recess (70) for receiving the mount part, and has upwardly-opening recesses (98, 120) for receiving the ears, to thereby fix the contact to the support plate. A switching contact (44A) includes a pair of laterally-spaced blades (162) and a switching beam (156) lying between the blades but connected to them so when the blades are depressed by a card, the beam is depressed against a trace (163) on a circuit board.

6 Claims, 19 Drawing Sheets

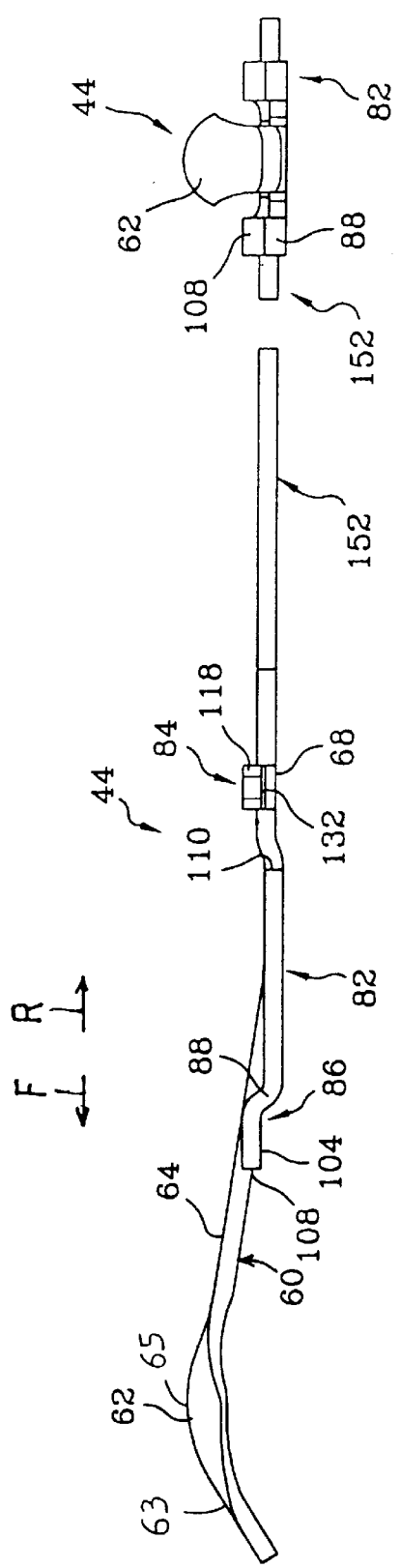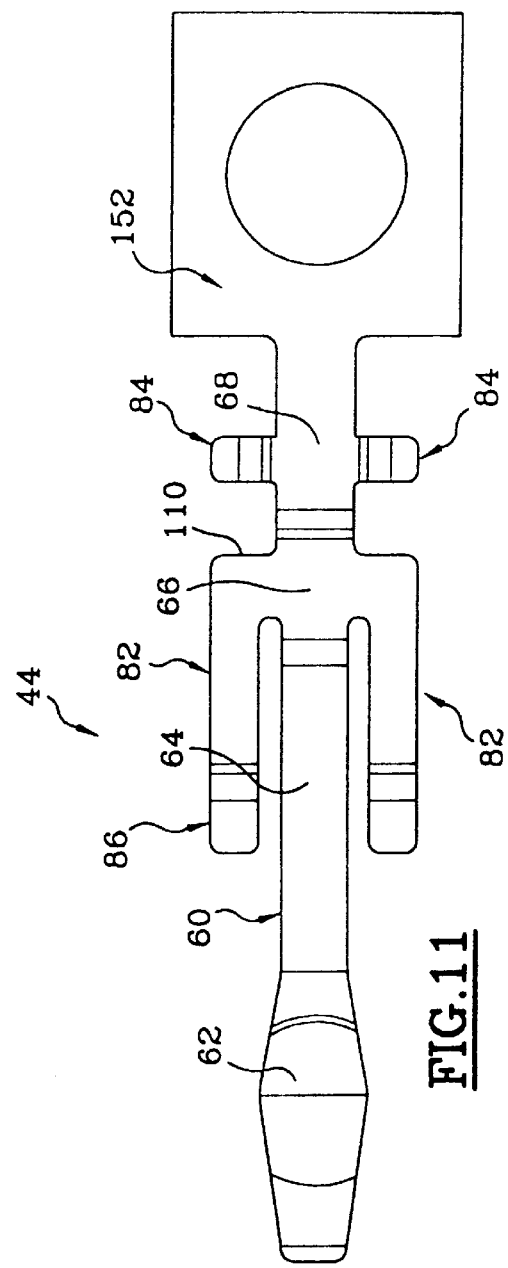

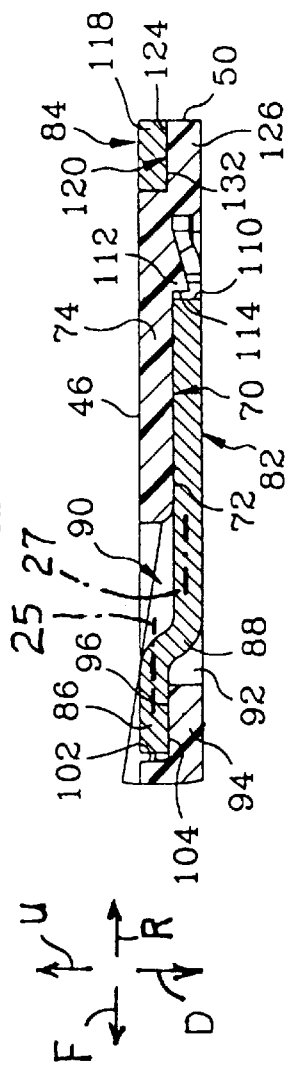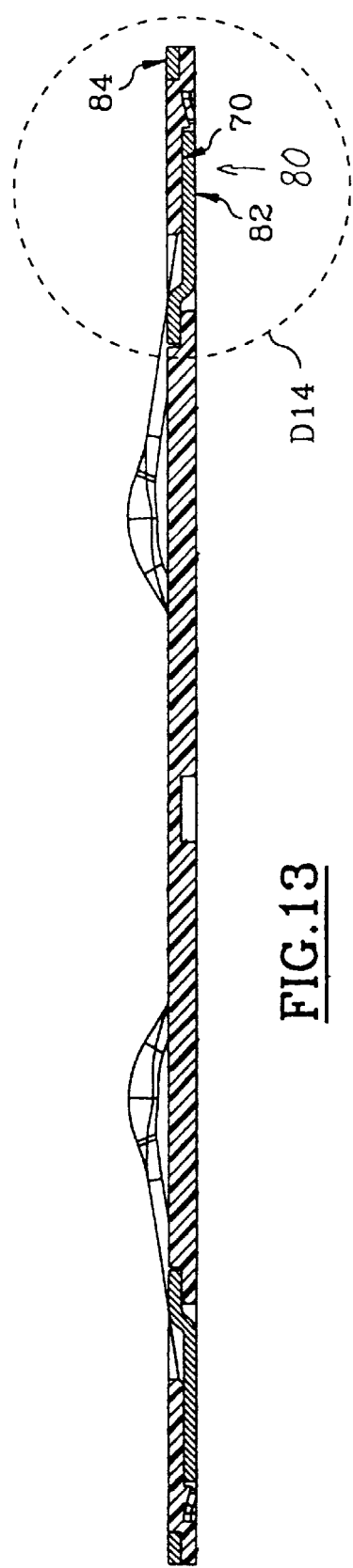

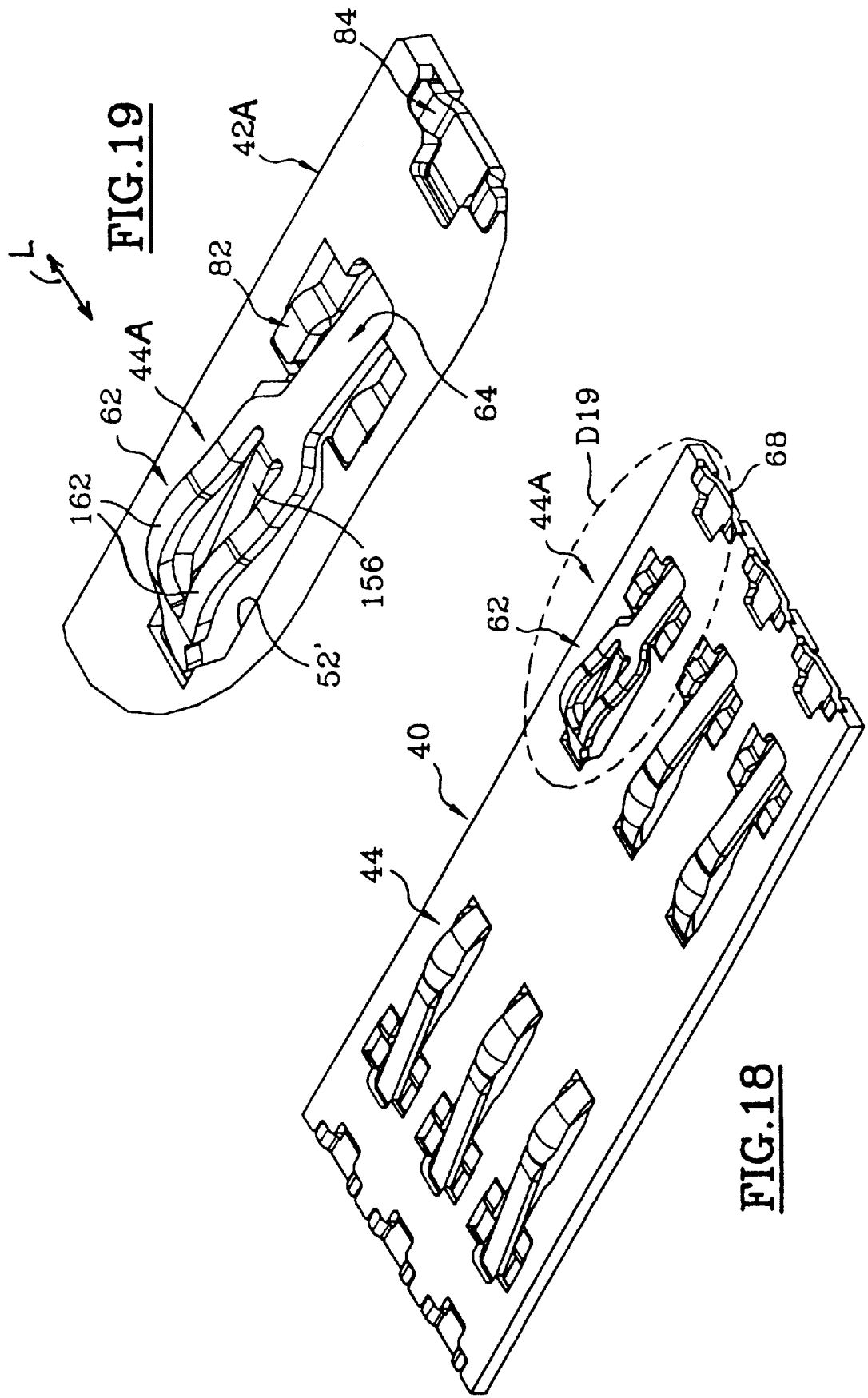

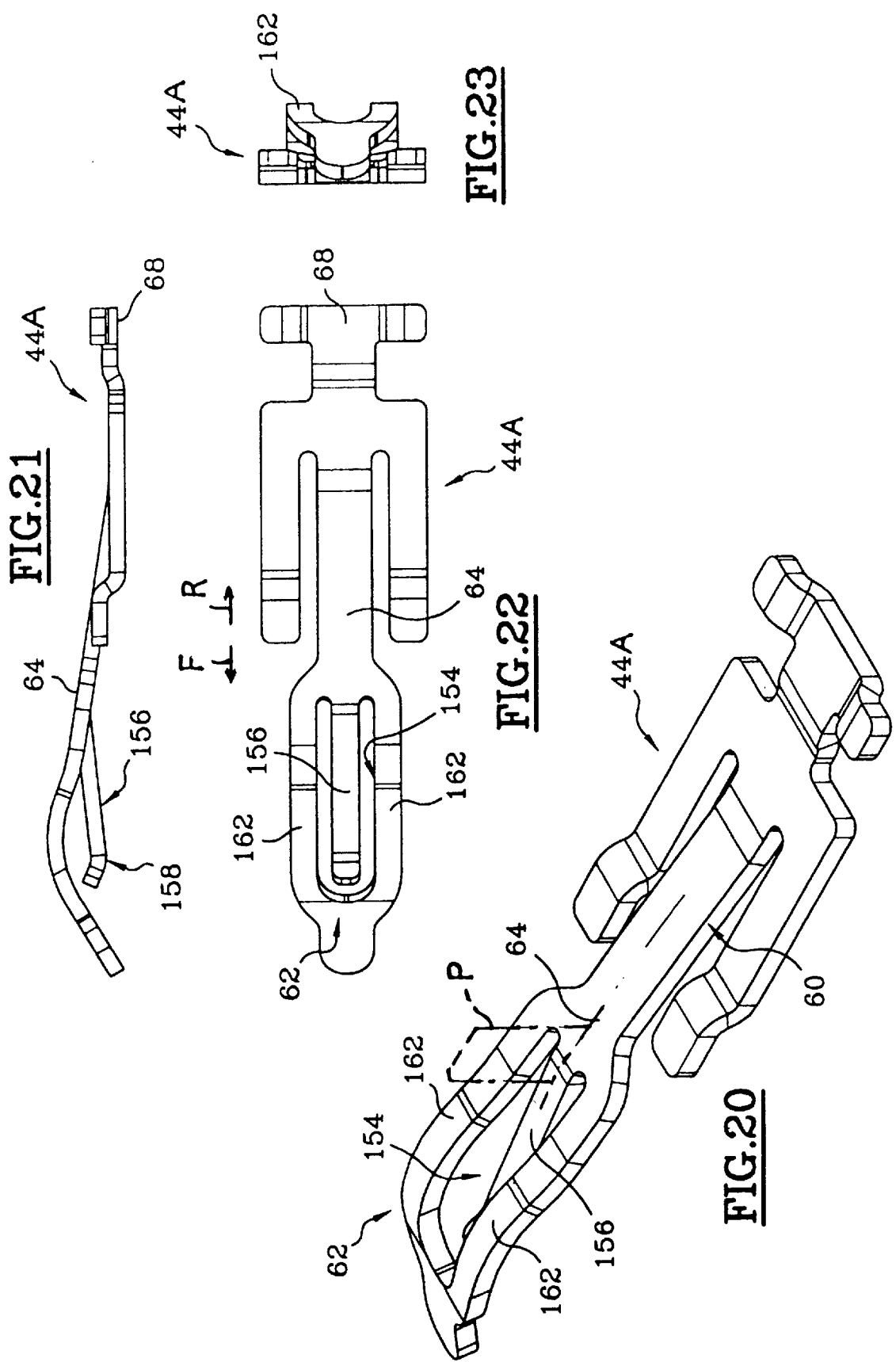

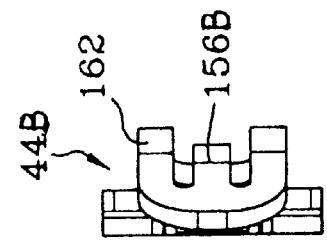
FIG.35
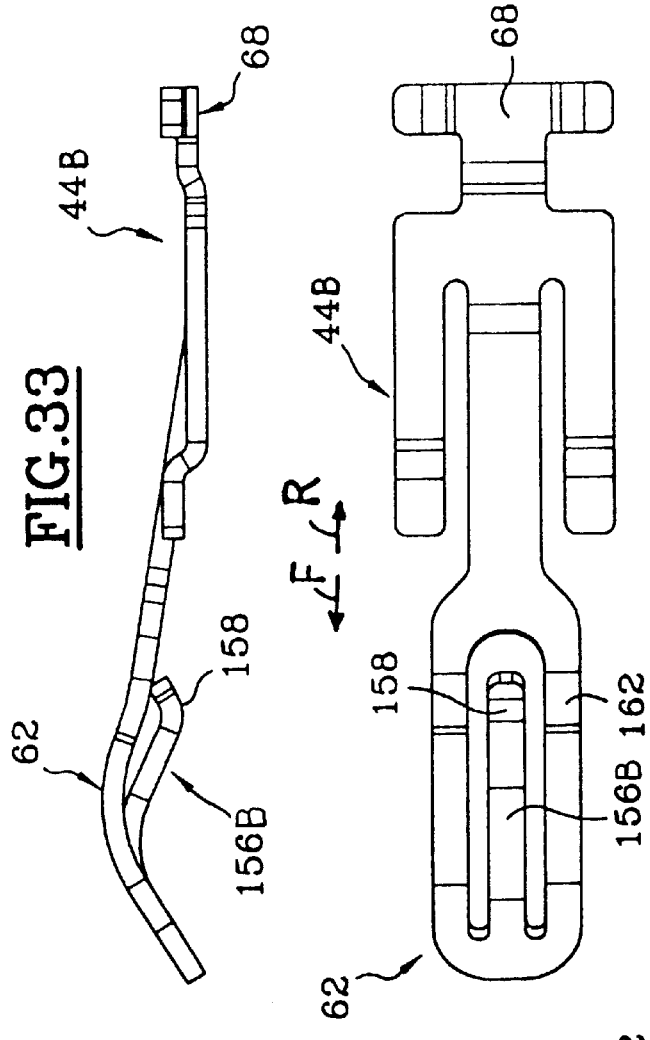
FIG.33
FIG.34
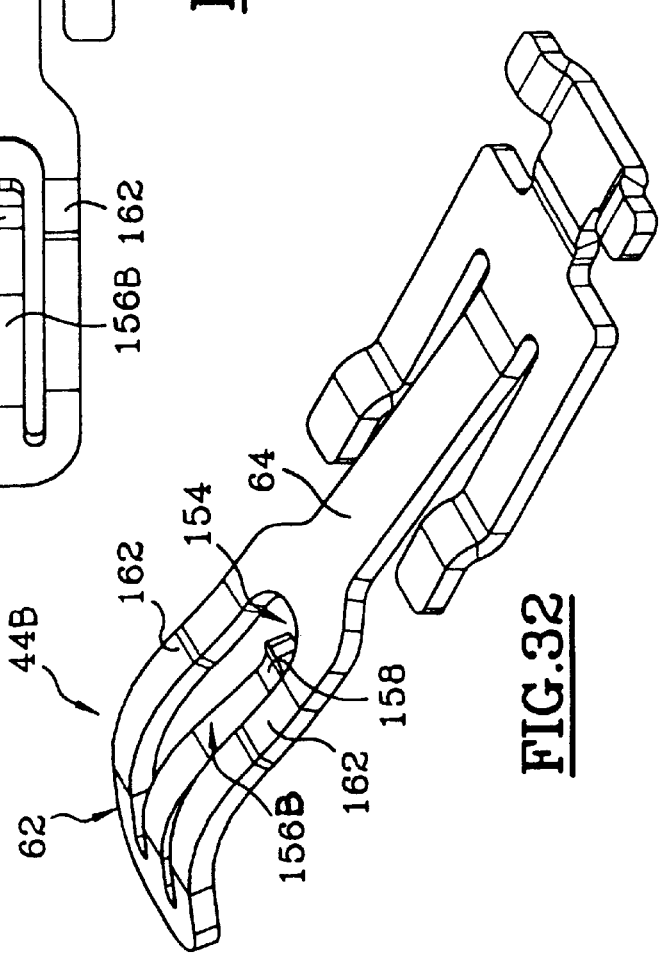
FIG.32

THIN SMART CARD CONNECTOR

CROSS-REFERENCE

This patent application claims priority from French patent application 9716565 filed Dec. 26, 1997, and this application is a continuation of Ser. No. 09/218,118 filed Dec. 21, 1998, U.S. Pat. No. 6,053,776.

BACKGROUND OF THE INVENTION

Smart cards commonly have a memory chip in them, which can be accessed through contact pads on a face of the card. A smart card reader commonly includes a circuit board, a support plate mounted on the circuit board, and contacts mounted on the support plate and engaging electrically conductive traces on the circuit board. The contacts have blades that project above the plate to engage the contact pads of the smart card, and have connection ends that are soldered to the traces on the circuit board.

There is a need for connectors of a small thickness, as measured between the upper face of the circuit board and the lower face of the card. A requirement for small thickness results from new applications that make use of smart cards, such as small wireless telephones, etc., which may require the entire device to fit into a shirt pocket. The minimum thickness of prior connectors, between the upper face of the circuit board and the lower face of the smart card, was greater than 1 mm. A connector of smaller thickness would be of value. Some common requirements for such connectors is that their contacts press with a force of about 0.4 N (newtons) per contact against the card pads, that they have a contact travel of about 0.6 mm, that they preferably be capable of surface-mount connection to the circuit board, and that they can withstand temperatures of about 240° C. to withstand reflow soldering processes.

SUMMARY OF THE INVENTION

In accordance with one embodiment of the invention, a smart card electrical connector is provided which is of small thickness while providing secure mounting of the contacts. The connector includes an insulative support plate for lying on a circuit board and contacts mounted on the support plate, with each contact having a blade that projects at an upward incline above the upper face of the support, and having a rear portion for mounting on the support plate. The contact rear portion includes a mount part that lies in a downwardly-facing recess of the support plate, and a pair of retainers on laterally opposite sides of the mount part. The retainers have ears that lie in a higher plane than the mount portion and that lie in upwardly-facing recesses in the support plate. Each retention tab preferably has front and rear ears that each lies in a recess of the support plate.

At least one of the recesses forms a rearwardly-facing shoulder and at least one of the recesses forms a forwardly-facing shoulder, to prevent forward-rearward movement of the contact. One of the shoulders such as the forwardly-facing shoulder, can be formed at the front end of an inclined surface to enable the contact to snap into place. The ears can lie at the ends of elongated beams, so the ears can be deflected together to prevent "rattling" of the contact.

One of the contacts can include a switching contact which includes a pair of laterally spaced blades and a switch beam that lies between the blades. The switch beam has a first end that is coupled to the blades to be depressed when the blades are depressed, and the switch beam has a free second end. When the blades are depressed by a card, they cause the switch beam to be depressed until its free second end engages a conductive trace on the circuit board, without the card directly engaging the switch beam.

The novel features of the invention are set forth with particularity in the appended claims. The invention will be best understood from the following description when read in conjunction with the accompanying drawings.

BRIEF DESCRIPTION OF THE DRAWINGS

FIG. 10 is a side elevation view of the contact of FIG. 8, but before the contact is cut from a larger sheet of metal.

FIG. 11 is a top view of the contact of FIG. 10.

FIG. 12 is a front end view of the contact of FIG. 10.

FIG. 13 is a sectional view of a portion of the connector of FIG. 1, showing the retaining tabs.

FIG. 14 is an enlarged view of the area D14 of FIG. 13.

FIG. 18 is an isometric top view of a second embodiment of the invention, which includes a switching contact for detecting the presence of a card.

FIG. 19 is an enlarged view of the area D19 in FIG. 18.

FIG. 20 is an isometric view of one of the switching contacts of the connector of FIG. 18.

FIG. 21 is a side view of the contact of FIG. 20.

FIG. 22 is a top view of the contact of FIG. 20.

FIG. 23 is a front elevation view of the contact of FIG. 22.

FIG. 32 is a top rear isometric view of a switching contact constructed in accordance with another embodiment of the invention.

FIG. 33 is a side elevation view of the switching contact of FIG. 32.

FIG. 34 is a plan view of the switching contact of FIG. 33.

FIG. 35 is a front elevation view of the contact of FIG. 34.

DESCRIPTION OF THE PREFERRED EMBODIMENTS

Figure 1:
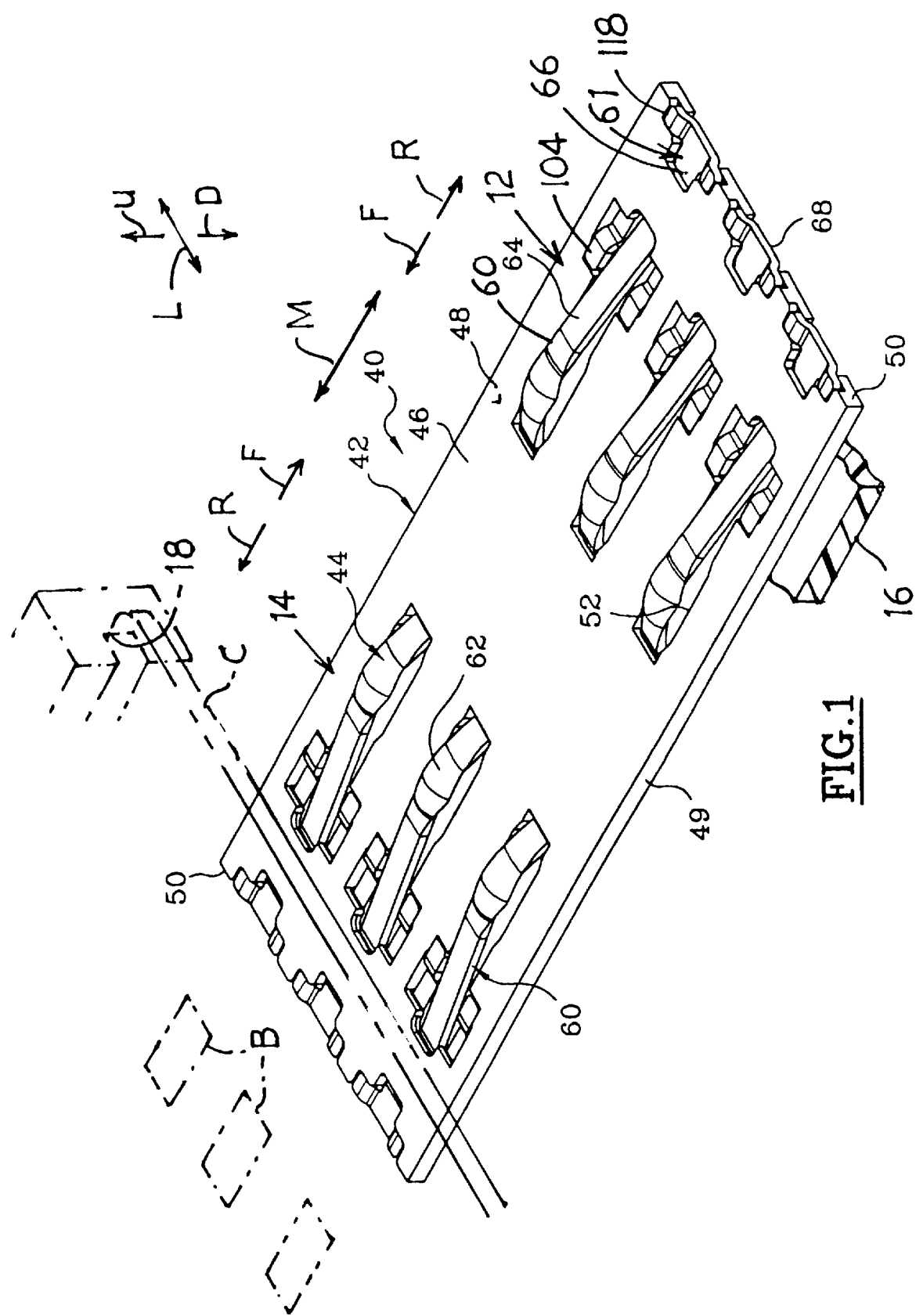
FIG. 1 is an isometric top view of a connector of the present invention.
Figure 2:
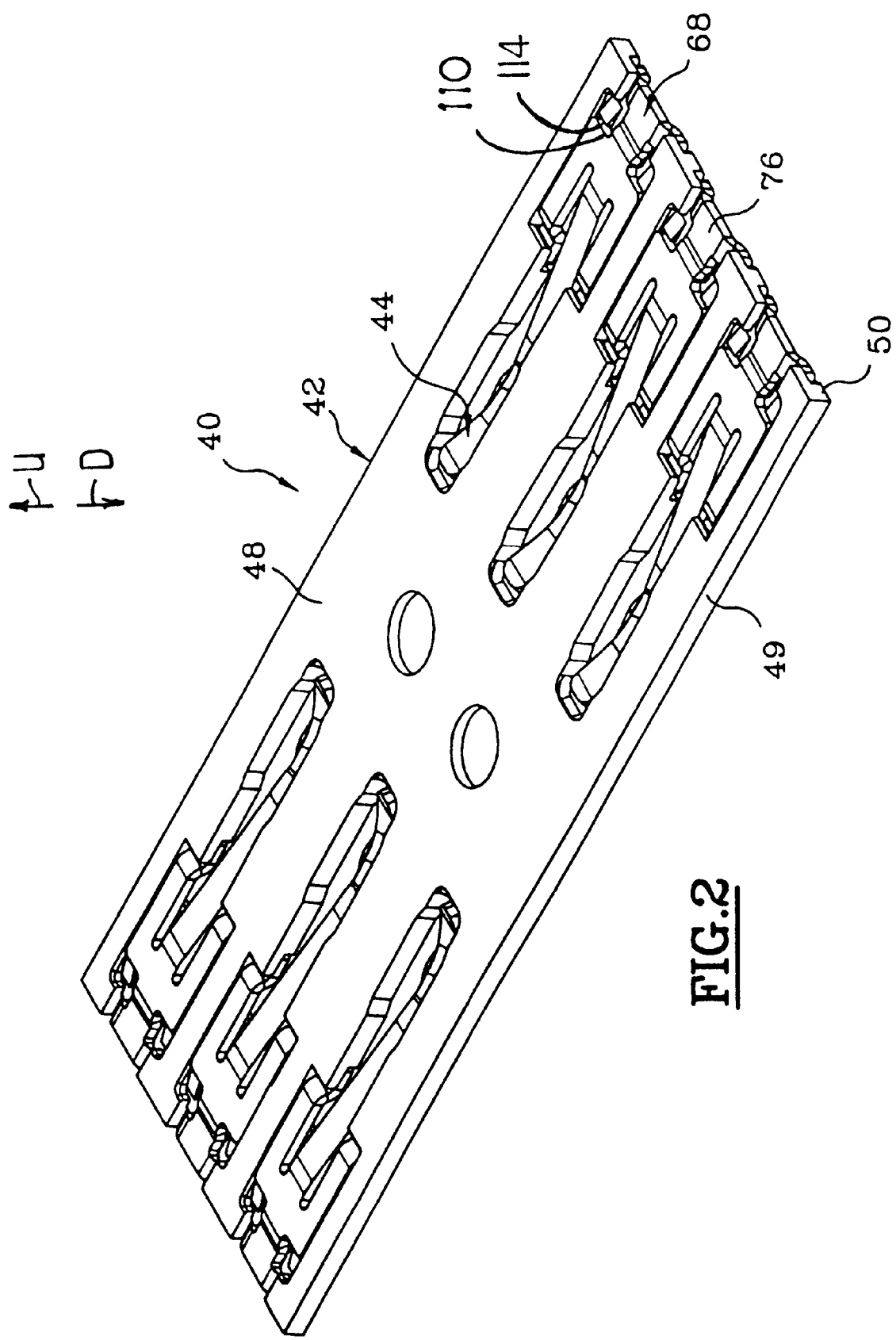
FIG. 2 is an isometric bottom view of the connector of FIG. 1.
Figure 3:
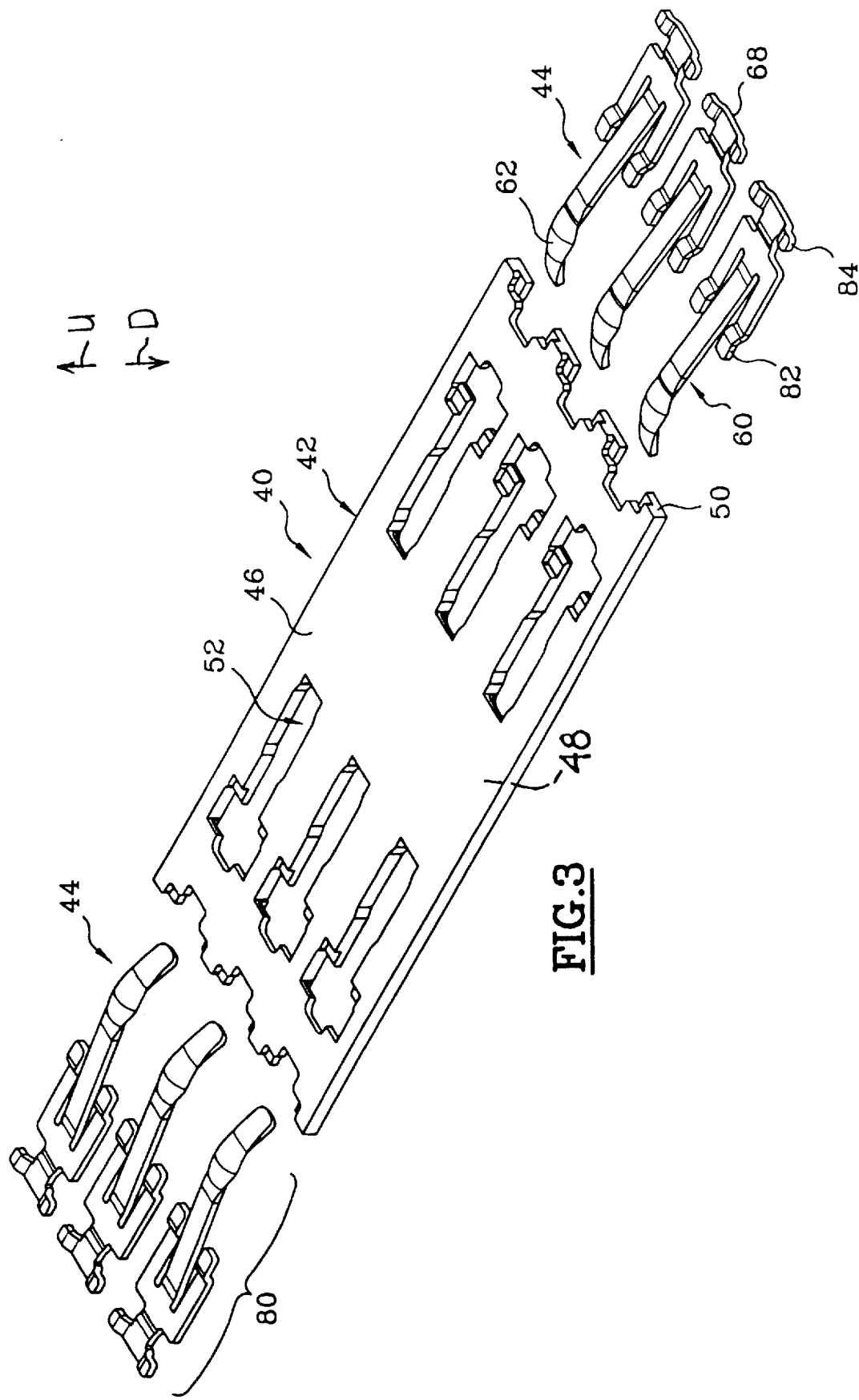
FIG. 3 is an exploded isometric view of the components of the connector of FIG. 1.
Figure 4:
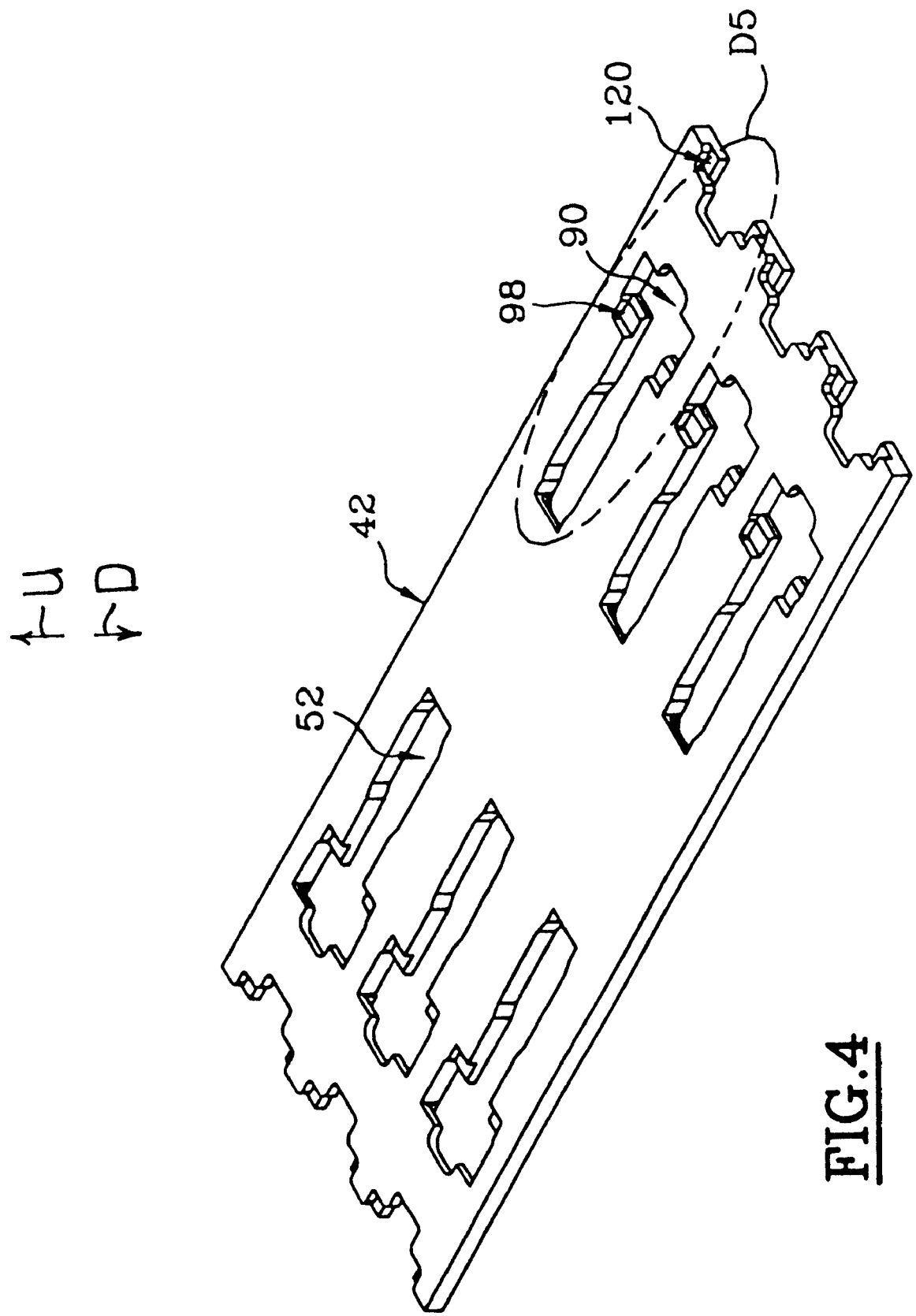
FIG. 4 is a top isometric view of the support plate of the connector of FIG. 1.
Figure 6:
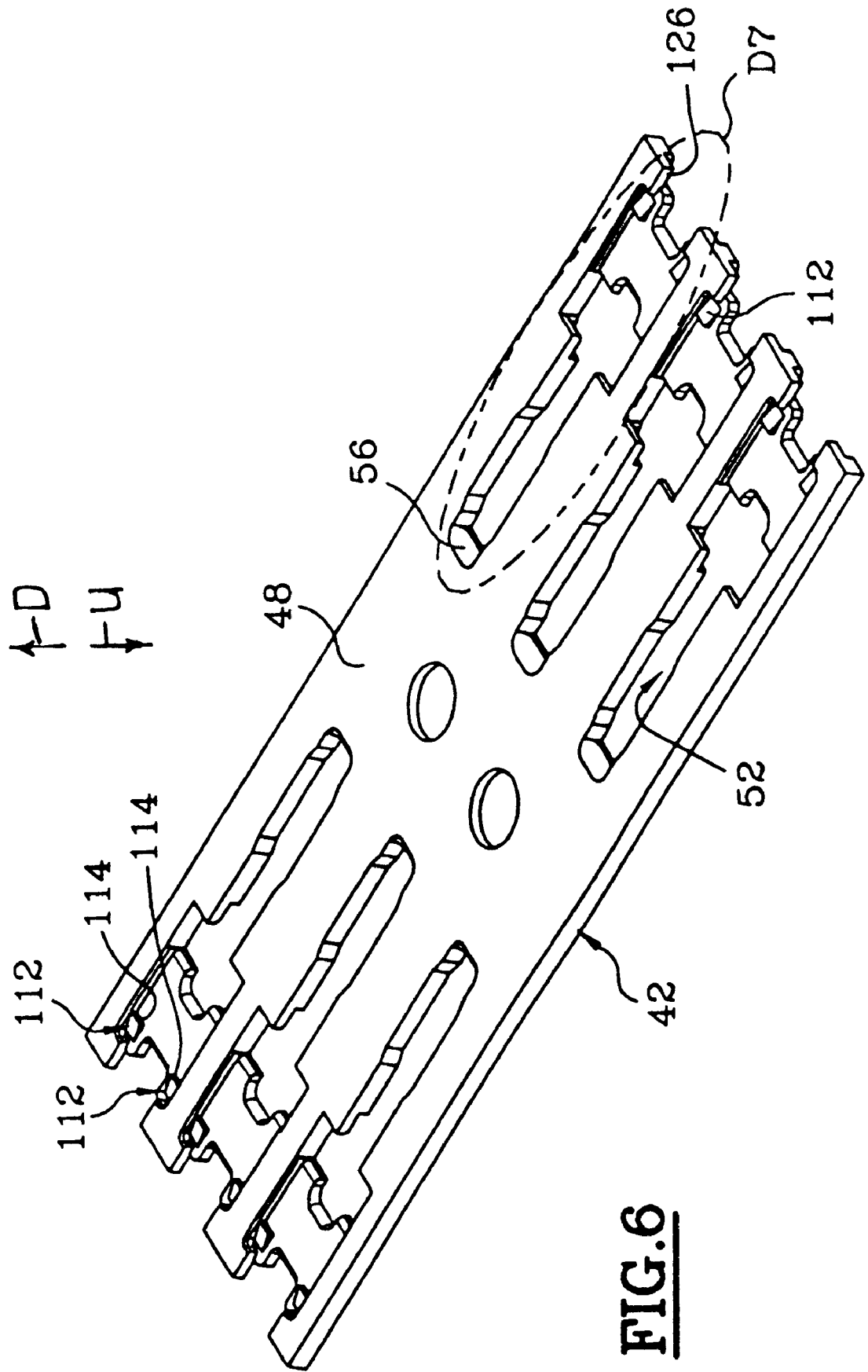
FIG. 6 is a bottom isometric view of the support plate of FIG. 1.

FIG. 1 illustrates an electrical connector 40 which includes an insulative support plate 42 and a plurality of electrical contacts 44. The support plate is mounted on a circuit board 16, with connection ends 68 of the contacts soldered to traces on the circuit board. A smart card C with contact pads B is inserted in a longitudinal direction M over an upper face 46 of the insulative support, with the contact pads engaging blades 60 of the contacts when the card is in its fully installed position. A card guide 18 engages laterally L opposite sides of the card to guide it along its path of sliding to its final position. It is also possible for the card to be moved downward D to its final position. An opposite upward direction is indicated by arrow U. The contacts are arranged in two rows 12, 14, with the contacts in one row being turned 180 degrees about a vertical axis with respect to the contacts of the other row. To indicate longitudinal directions, applicant defines forward and rearward directions F, R for each row, with the contact blades 60 lying at the front of each contact and with each contact having a rear portion 61 where the contact is mounted. It is noted that the support plate 42 is of substantially rectangular shape, with longitudinally opposite lateral edges 50 and laterally opposite edges 49. The support plate 42 has upper and lower faces 46, 48.

Figure 8:
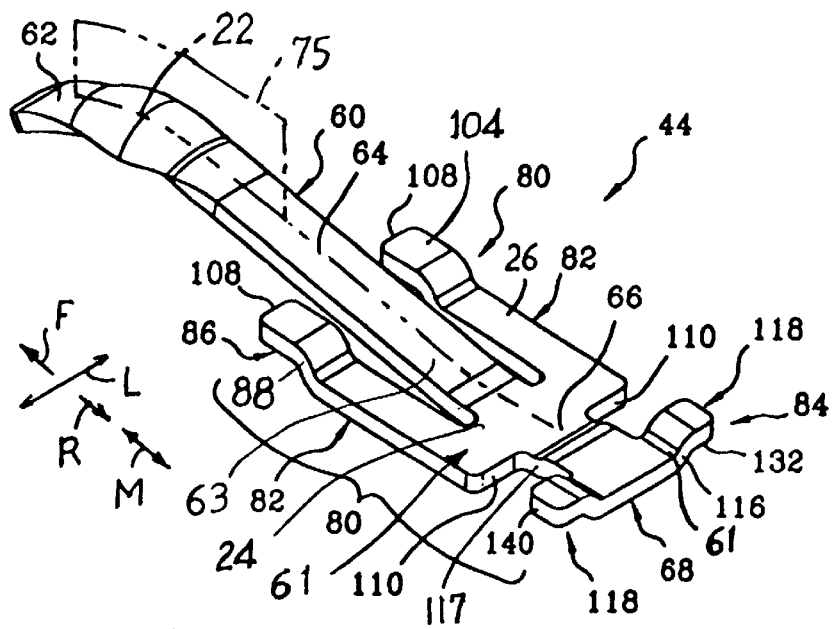
FIG. 8 is an isometric rear view of a contact of the connector of FIG. 1.

FIG. 8 shows that each contact 44 includes the resiliently deflectable contact blade 60 and the contact rear portion 61. The contact blade has a free front end 62 with a convexly curved upper face and which has a contact location 22 where the contact engages a smart card pad. The blade has a part 64 that extends to a blade rear end 63 that merges with the contact rear portion 61. The contact rear portion includes a mount part 66 that lies directly rearward of the blade 60 and a pair of retainers 80 lying at laterally opposite sides of the mount part 66 and connected thereto by lateral joiner parts 24. It is noted that the contact has a vertical center plane of symmetry 75 that extends along the contact blade 60 and through the middle of the mount part 66, with the retainers 80 lying on laterally opposite sides of the center plane.

Each of the retainers 80 includes front and rear branches 82, 84. The front branch 82 includes a longitudinally extending beam 26 that extends forwardly from a joiner part 24, and an ear 104 that is bent to lie higher than the mount part 66. Each of the rear branches 84 also includes an ear 118 that is bent to extend in a plane that is higher than the plane of the mount portion 66. Each ear 118 has a raised lower surface 132 and a side edge 140. The mount portion 66 lies in a downwardly-opening recess in the support plate, while the ears 104, 118 lie in upwardly-opening recesses in the support plate. It would be possible to have the ears lie in downwardly opening recesses and the mount part lie in an upwardly-opening recess, although the blade would then extend at a smaller incline unless the blade were bent to extend through a downwardly-opening recess.

Figure 5:
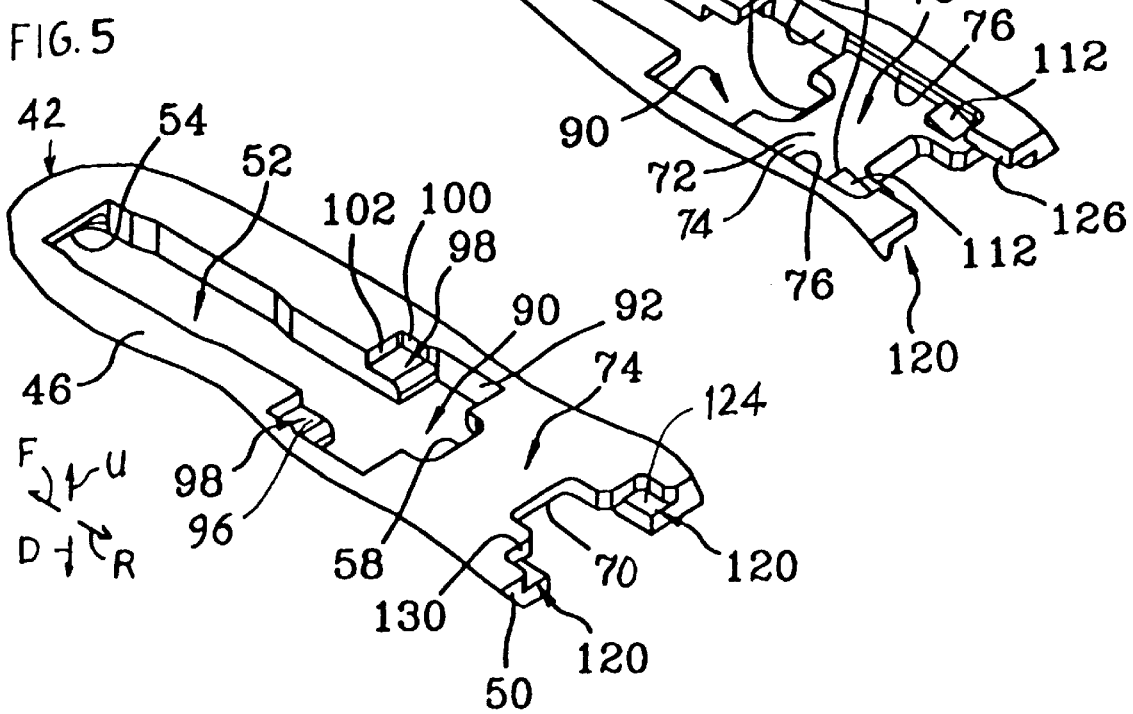
FIG. 5 is an enlarged view of the area D5 of FIG. 4.
Figure 9:
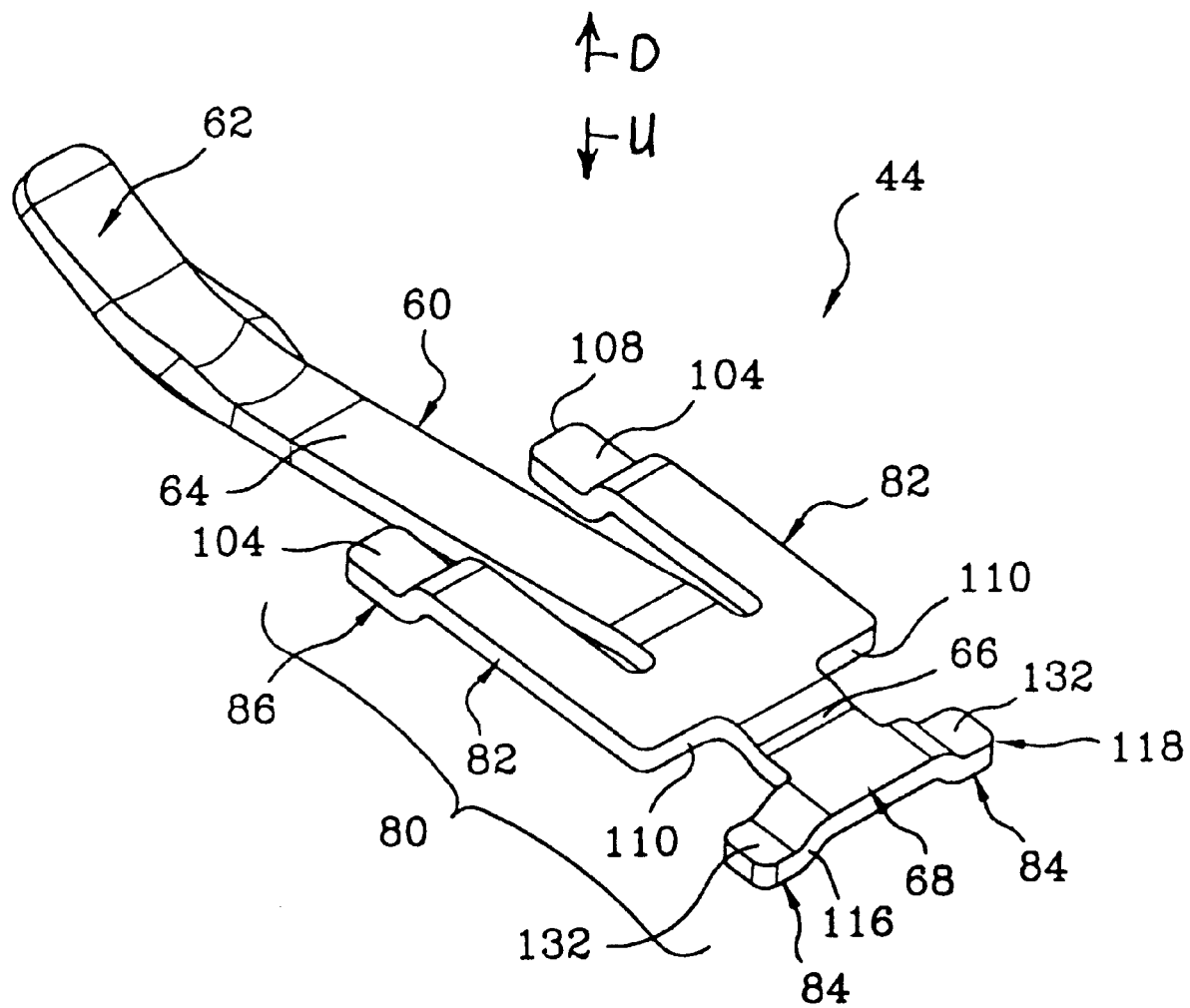
FIG. 9 is an isometric bottom view of the contact of FIG. 8.

FIG. 5 shows a portion of the support plate 42. The support plate has a longitudinally-extending slot 52 with a rear portion 90 having a cutout 58, through which the contact blade extends. The support plate has a downwardly-opening cavity or recess 70, and has four upwardly-opening recesses 98, 120. Walls 126 forming the recesses 120, have upper surfaces 124. As mentioned above, the mount part 66 of the contact of FIG. 8 lies in the downwardly-opening recess 70. The ears 104, 118 of the contact lie in the upwardly-opening recesses 98, 120. FIG. 1 shows how the mount part 66 and ears 104, 118 are mounted in the recesses. The mount part 66 prevents upward movement of the contact, while the four ears 104, 118 limit tilt of the contact and its contact blade about any axis.

Figure 15:
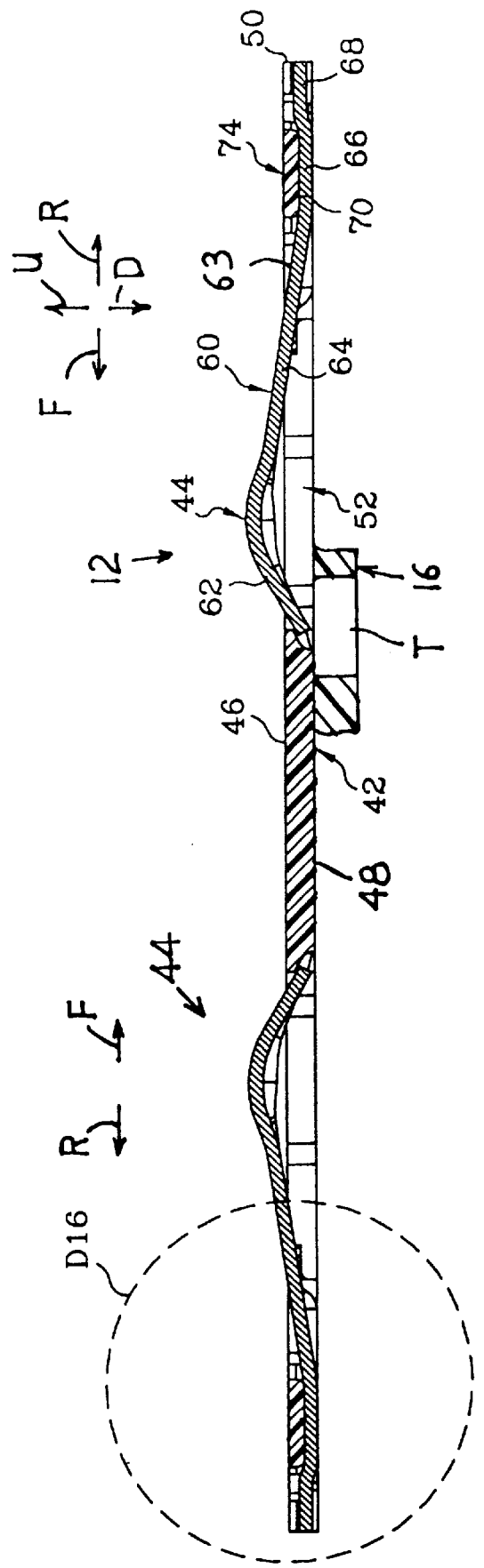
FIG. 15 is a sectional view of a portion of the connector of FIG. 1.
Figure 16:
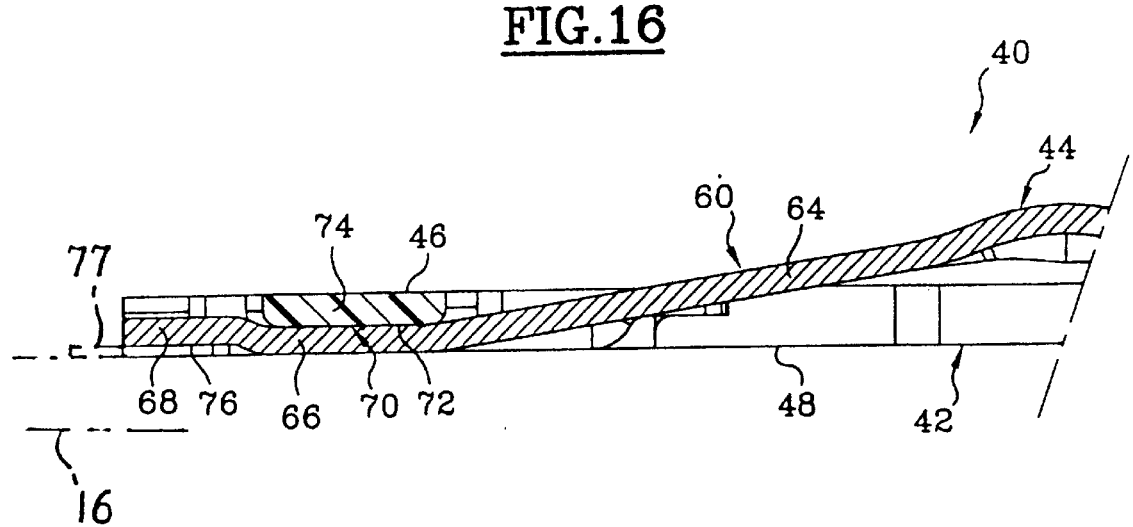
FIG. 16 is an enlarged view of the area D16 of FIG. 15.

FIG. 15 shows that the contact blade 60 projects at a forward and upward incline to above the upper face 46 of the support plate 42. The mount part 66 which lies in the recess 70, lies under a thin part 72 of the support plate. The rear connection end 68 is bent to be very slightly above the mount part 66 to accommodate the thickness of a trace 77 (FIG. 16) on the circuit board to which the surface 76 of the connection end 68 is soldered. FIG. 16 shows details for another contact 44 of the connector.

FIG. 13 shows the front and rear branches 82, 84 of a retainer 80. FIG. 14 shows the area in greater detail. The front branch 82 lies within the downwardly-opening recess 70 in the support plate, and is joined by an S curve bend 88 to the front ear 104. Front ear 104 lies in an upper plane 25 that is higher than the lower plane 27 in which most of the retainer forward branch 82 lies and in which the mount part 66 lies. As shown in FIG. 8, the front branches 82 have beams 26 that are elongated in a longitudinal direction M which allows their ears 104 to be resiliently moved slightly together and apart along a lateral direction L. This allows the ears to be deflected slightly together when they press against side edges 100 (FIG. 5) side walls 92 of of the recesses 98 in which the ears lie. The ears lie against an upper surface area 96 while the contact rear portion 61 lies against a lower portion 74. Such clamping of the ears 104 by deflecting them slightly together, helps prevent movement of the contacts within the support plate while accommodating tolerances.

Figure 7:
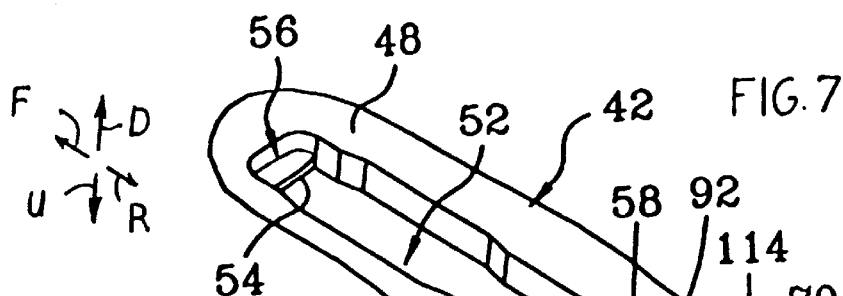
FIG. 7 is an enlarged view of the area D7 of FIG. 6.

FIG. 8 shows that each forward branch 82 of the retainer forms rearwardly-facing shoulders 110 at its rear. The rearwardly-facing shoulders engage forwardly-facing support shoulders 114 (FIG. 7) near the rear of the downwardly-opening recess 70. At the same time, the front ears 104 have forwardly-facing edges 108 which engage rearwardly-facing support shoulders 102 (FIG. 5) at the front of the upwardly-opening recesses 98. This prevents forward and rearward longitudinal movement of the contact within the support plate. The shoulders 114 are formed on catches 112 that have downwardly-forwardly inclined bottom surfaces that aid in snapping the contact into position as it is installed so its full installation can be sensed.

Each rear branch 84 has an S-shaped bend 116 that places the ear 118 at a higher level than the mount portion 66. As mentioned above, the contact is soldered at the connection end 68 to a trace on the circuit board, the connection end 68 being very slightly raised, as by 0.07 mm, to account for the thickness of the circuit board trace under it. A slight bend at 117 allows the slight raising of the connection end.

The free front end 62 of each contact blade lies in a downwardly-opening recess 56 of the support plate. The contact front end 62 is biased slightly upwardly against a top wall 54 of the front recess 56. This prevents the blade front end 62 from being exposed, and possibly being damaged if an object is slid under it. It is noted that the circuit board 16 of FIG. 15 has holes T into which the front end of the blade can be depressed, to enable the connector to have a very low height above the upper face of the circuit board. FIG. 10 shows that the blade front end 62 has a downward-forward inclined part 63 lying forward of the topmost location 65 of the contact blade. The inclined part 63 is received in a circuit board hole.

The support 42 is preferably molded of insulative or dielectric material. It preferably has a thickness of less than 1 mm, and may have a thickness of about 0.4 mm with its thinnest parts such as 74 having a thickness of about 0.2 mm. In an electrical connector that applicant has designed, the support 42 has a thickness 0.37 mm, with part 74 having a thickness of 0.2 mm and with the contact blade part 66 having a thickness of 0.17 mm. No large stresses are applied to the support plate and therefore it is very stable during high temperature solder reflow operations. The support plate has sufficient flexibility to assure that the connector is robust when its contacts are soldered to traces on the circuit board, even when the circuit board is subjected to torsional deformation. The amount of material in the support plate is very small, allowing the use of very high strength polymers which have a high cost per unit mass.

Figure 17:
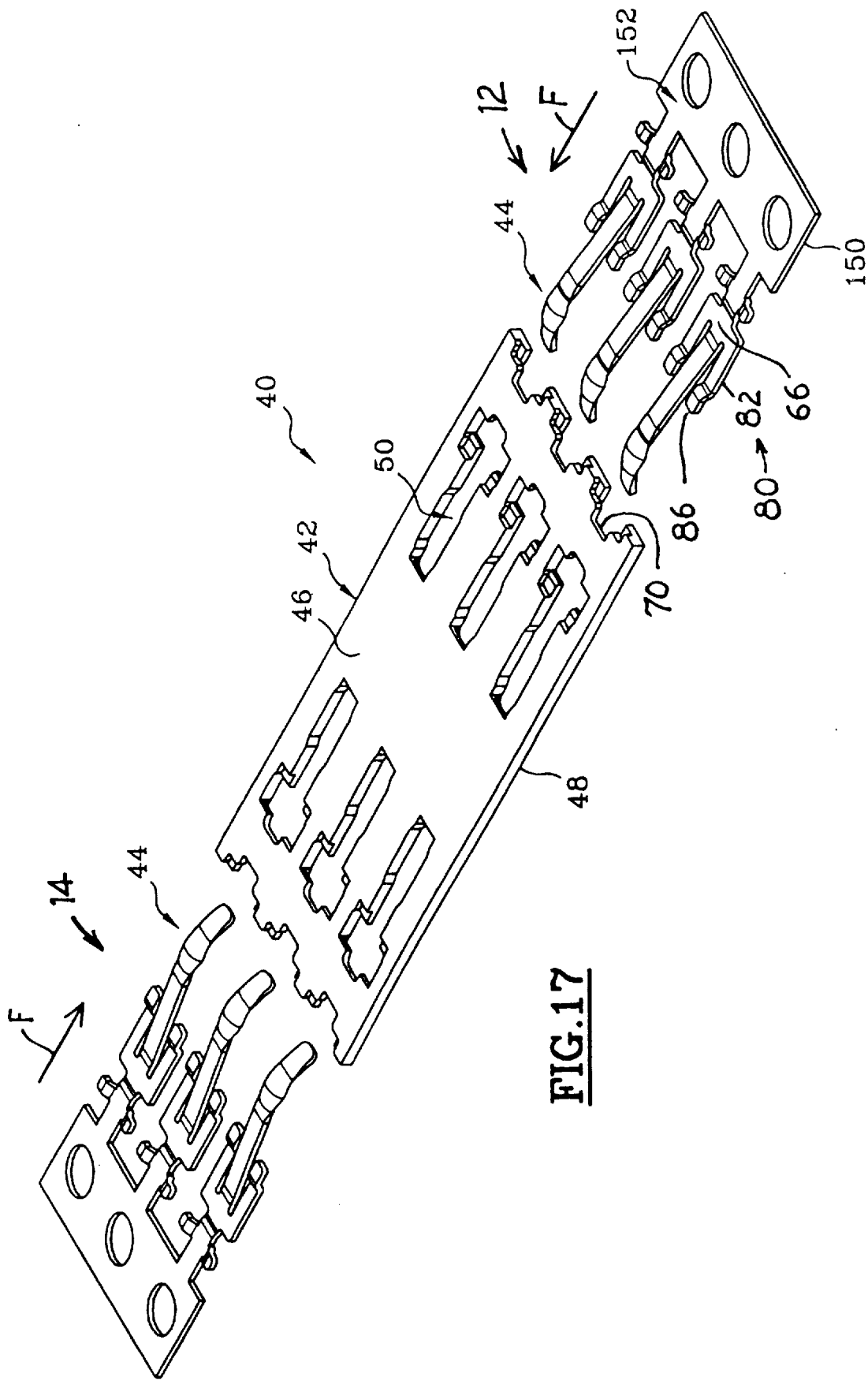
FIG. 17 is an exploded isometric view similar to that of FIG. 3, but showing a manufactured metal sheet from which the contacts are cut.

As shown in FIG. 17, the contacts 44 are produced by cutting and bending a sheet of electrically conductive material 150 such as a copper alloy. A portion 152 of the sheet forms a contact holder for holding each row 12, 14 of contacts together as they are simultaneously inserted into the support plate. The portion 152 is then cut from the contacts. To insert each contact, the three contacts are positioned below the lower face 48 of the support plate 42 so the front ends 86 of the front branches 82 of the retainers 80 lie below the recesses in the support plate. The contacts are then raised upwardly to bring the mount parts 66 against the upper wall of the downwardly-extending recesses 70. Finally, the row of contacts is moved forward until the contacts are snapped into the mounted position, with their ears lying in the upwardly-extending recesses. Finally, the portions 152 are separated from the contacts.

Figure 25:
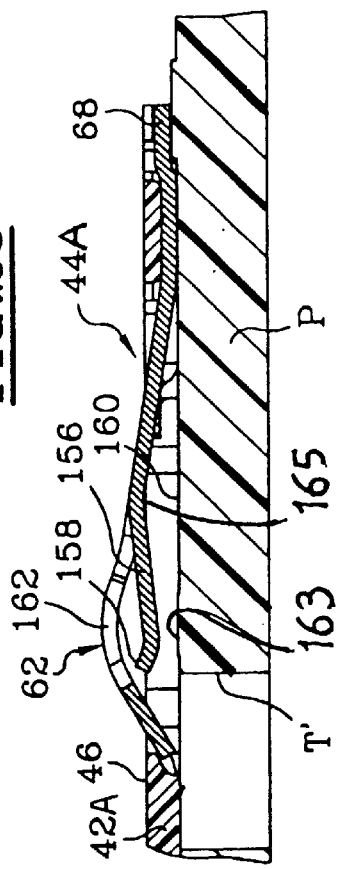
FIG. 25 is a sectional view taken on line 25—25 of FIG. 24.
Figure 24:
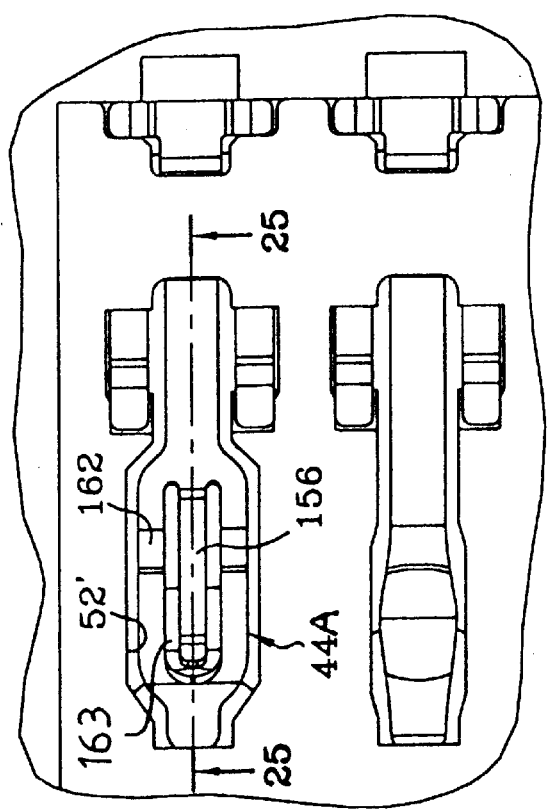
FIG. 24 is a partial top view of the connector of FIG. 18 with a switching contact in the rest, or open position.
Figure 27:
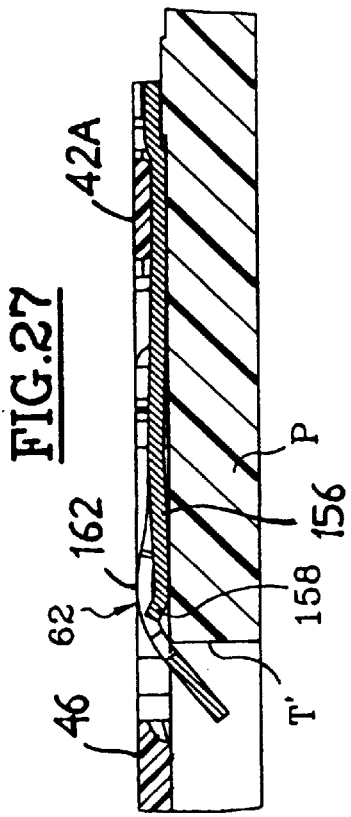
FIG. 27 is a view taken on line 27—27 of FIG. 26, and which is similar to FIG. 25 except that the switching contact is in a closed position.
Figure 26:
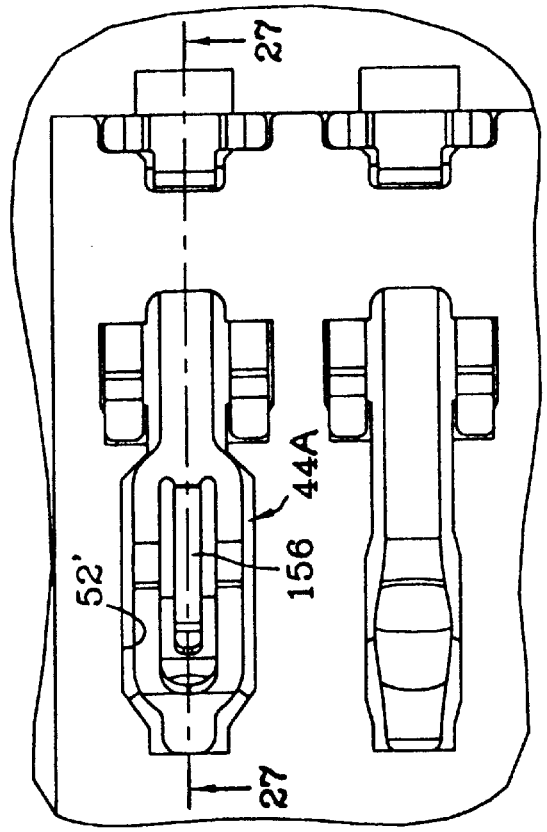
FIG. 26 is a view similar to that of FIG. 24, but with the switching contact in a closed position.
Figure 29:
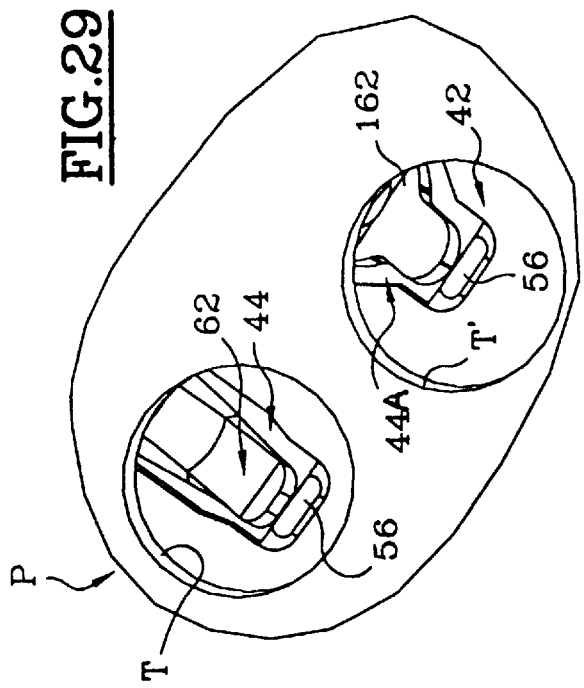
FIG. 29 is an enlarged view of the area D29 of FIG. 28.

FIG. 19 illustrates a switching contact 44A which is similar to the earlier-described contacts, except that the switching contact includes a pair of laterally L spaced contact blades 162 and a switch beam 156 lying between them. The contact blades 162 are joined together at both their front and rear ends. The switch beam 156 is connected to only the rear ends of the contact blades in the embodiment of FIGS. 18–30. FIG. 25 shows that a free front end 158 of the switch beam 156 lies over a trace 163 on the circuit board P. The beam front end 158 has a lower surface that is convexly curved to avoid damage to the trace 163 when the front end 158 presses against it. When a card slides over the switching contact 44A, it directly engages the blades 162 to depress them, thereby depressing the rear ends 165 of the switch beam until its front end 158 engages the circuit board trace. FIG. 27 shows the front end 62 of the blades 162 depressed so they are substantially even with the upper face 46 of the support plate 42A. The front end 158 of the switch beam lies below the level of the front end 62 of the blade 162. As a result, the extreme tip of the switch beam 156 does not directly engage the smart card and cause scratching of it as the switch beam is depressed to its fully depressed position. With a rear connection end 68 of the switching contact soldered to a trace on the circuit board, the downward depression of the switch beam against the trace 163, results in closing a circuit that detects the full insertion of the smart card, or at least its insertion close to a fully inserted position.

Figure 30:
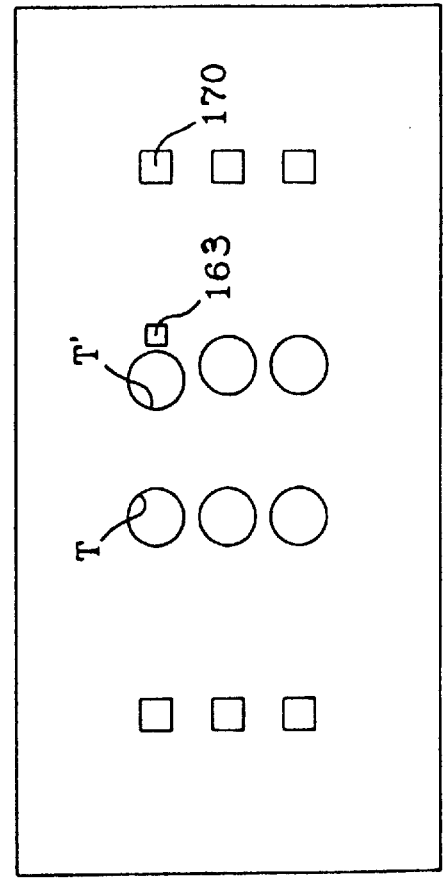
FIG. 30 is a top view of the circuit board of FIG. 28.
Figure 28:
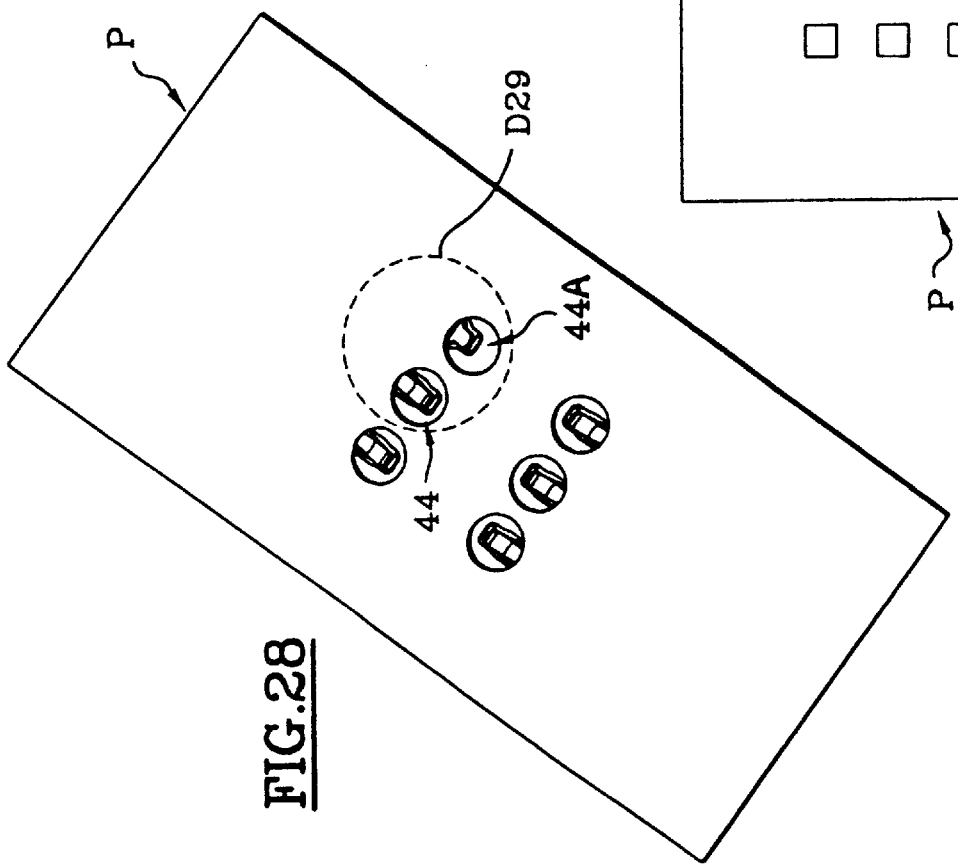
FIG. 28 is an isometric bottom view of the circuit board of FIG. 18.
Figure 31:
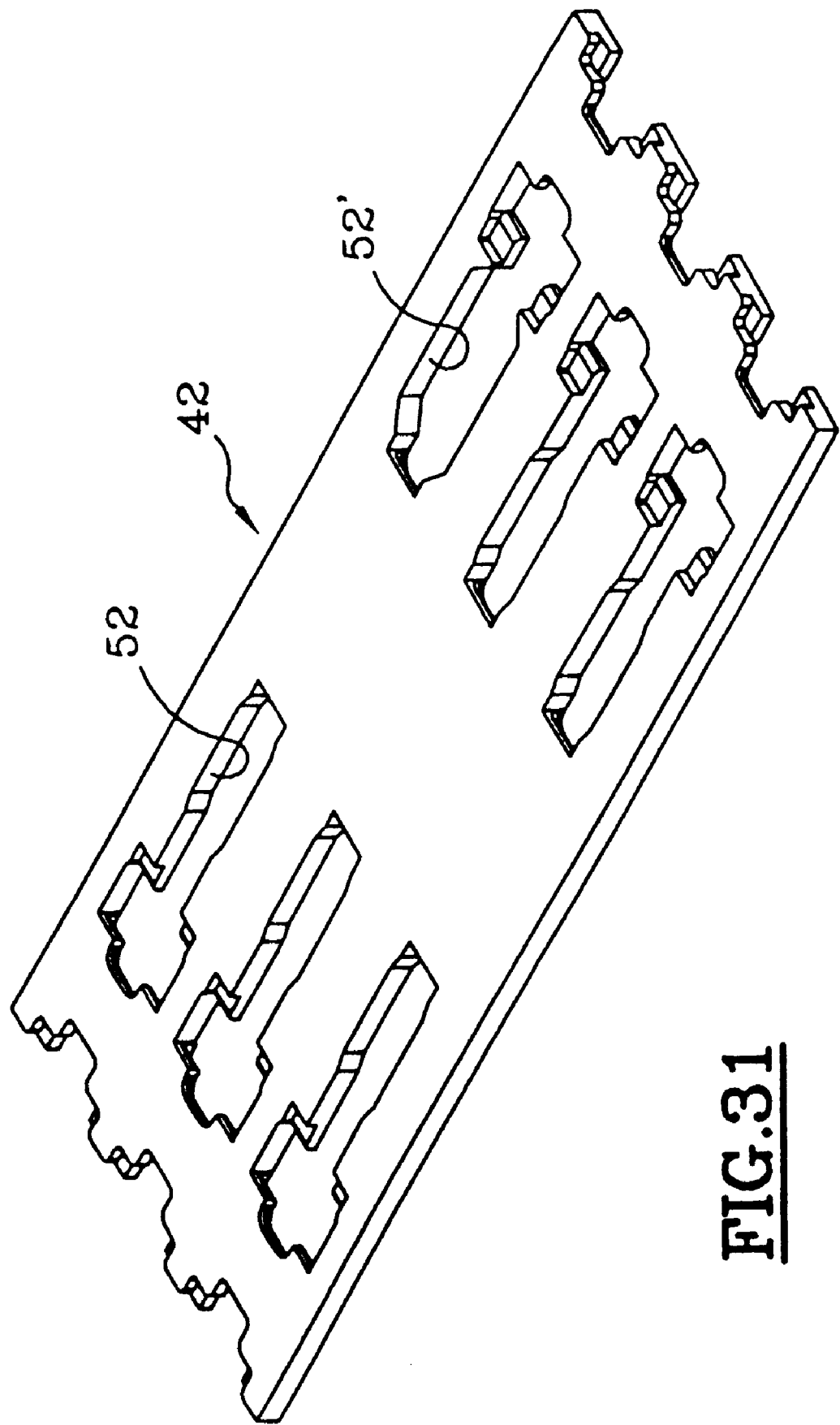
FIG. 31 is an isometric top view of the support plate of the connector of FIG. 18.
Figure 36:
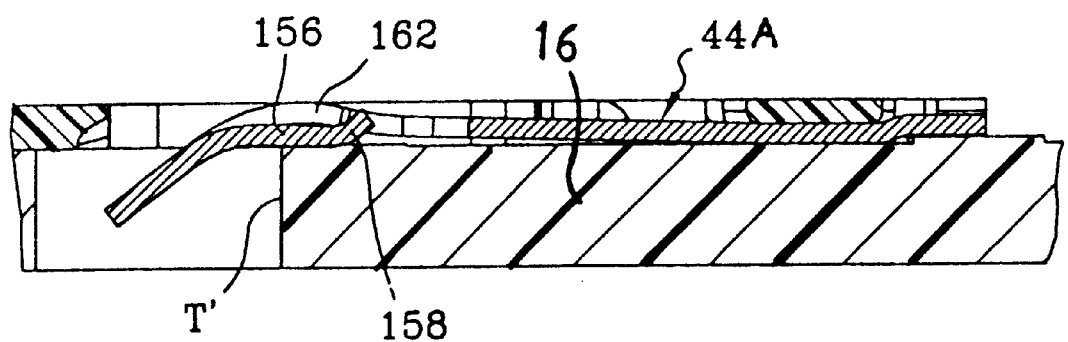
FIG. 36 is a sectional side view showing the contact of FIG. 33 in a fully closed position, and showing the support plate and a circuit board.

FIG. 30 shows two traces 163, 170 on the circuit board P, with the rear trace 170 being soldered to the rear of the contact and the front trace 163 lying under the front end of the switch beam. Holes such as T and T' receive the extreme front end of the contact blades.

FIGS. 32–36 illustrate another switching contact 44B which is similar to that of FIGS. 19–31, except that the switching blade 156B is joined to the front ends of the contact blades 162 instead of the rear end.

While terms such as "upward", "downward", etc. have been used to help describe the relative positions of the parts of the connector, the connector can be used in any orientation with respect to the Earth.

Thus, the invention provides an electrical connector of small thickness and rugged construction. The connector includes an insulative support plate and at least one contact mounted on the support plate. The contact has a card-engaging blade and has a rear portion for mounting the contact. The rear portion includes a mount part and a pair of retainers lying on laterally opposite sides of the mount part. The retainers have ears lying out of the plane of the mount part. The support plate has a first recess opening in a first direction such as the downward direction, which receives the mount part. The support plate has a plurality of additional recesses opening in a second direction such as the upward direction, which receives the ears. Each retainer preferably has front and rear branches with an ear at each branch, with the ears lying in a higher plane than the mount part and lying in upwardly-facing recesses while the mount part lies in a downwardly-facing recess. The front ears abut a rearwardly-facing shoulder of the support plate. The front ears lie at the front ends of elongated beams, and are deflected closer together. Where the rear tabs do not abut a forwardly-facing shoulder, a front branch of each retainer has a rearwardly-facing shoulder that abuts a forwardly-facing shoulder on an inclined catch of the support plate. A contact can be a switching contact, which includes a blade that directly engages an inserted card, and a switch beam with one end coupled to the blade to be depressed when the blade is depressed, and with the other end of the switch beam being a free end and being depressable against a switching trace on the circuit board. As a result, a card does not have to directly depress the switch beam, but needs only depress the contact blade. There are preferably two contact blades with the switch beam lying between them.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A switching apparatus for mounting on a circuit board that has a switch trace, and for being switched by a card that is moved closely over said circuit board, comprising:

a support plate of insulative material for mounting on said circuit board;

a contact having a rear portion mounted on said support plate, a pair of laterally-spaced blades (162) generally extending at a forward-upward incline from said rear portion and having card-engaging locations, and a switch beam lying between said blades and having a first beam end coupled to said blades to be depressed when said blades are depressed, and said beam having a second beam free end for lying over said trace of said circuit board;

said second beam free end lying sufficiently below said card-engaging locations so a trace-engaging location on said beam engages said trace while said card-engaging locations lie above said trace-engaging location.

2. The apparatus described in claim 1 including said circuit board, wherein:

said circuit board has a second trace lying rearward of said first trace, and said contact rear portion is soldered to said second trace.

3. A combination of a circuit board and an electrical connector, wherein the connector includes an insulative support having upper and lower faces and a slot, and at least one contact having a blade with front and rear blade portions wherein said front blade portion projects through said slot and above said upper face of said support, and with said contact having a rear portion for mounting under said support upper face and with said support lying on said circuit board wherein:

said blade front portion is curved with a convex surface facing upwardly, with said convex surface having a topmost location and with said blade front portion having a downward-forward inclined part lying forward of said topmost location;

said circuit board has a hole aligned with a portion of said slot and positioned to receive at least part of said downward-forward inclined part.

4. The combination described in claim 3 wherein:

said support is generally in the form of a plate with a downwardly-facing recess;

said contact rear portion has a flat part which is received in said recess and that is sandwiched between said circuit board and said support.

5. Apparatus for mounting on a circuit board that has an upper board face with a plurality of solderable traces thereon, and for engaging contact pads on a card that is moved to a position closely over and in a plane parallel to said upper board face, and for detecting the presence of the card, comprising:

a plurality of first contacts having portions lying on said circuit board and solderable to one of said solderable traces, with each of said first contacts having a blade extending at an upward incline to engage one of said card contact pads;

said circuit board having a switching trace;

a switch contact having a portion lying on said circuit board and soldered to one of said solderable traces, with said switch contact having a deflectable switch beam with a beam location lying over said switching trace but initially out of engagement with said switching trace, but being depressable against said switching trace;

said switch contact includes a blade extending higher above said circuit board than said switch beam and connected to said switch beam, so said switch beam is depressed when said blade is depressed by said card but said switch beam is not depressed primarily by direct engagement with said card.

6. Apparatus for mounting on a circuit board that has an upper board face with a plurality of solderable traces thereon, and for engaging contact pads on a card that is moved to a position closely over and in a plane parallel to said upper board face, and for detecting the presence of the card, comprising:

a plurality of first contacts having portions lying on said circuit board and solderable to one of said solderable traces, with each of said first contacts having a blade extending at an upward incline to engage one of said card contact pads;

said circuit board having a switching trace;

a switch contact having a portion lying on said circuit board and soldered to one of said solderable traces, with said switch contact having a deflectable switch beam with a beam location lying over said switching trace but initially out of engagement with said switching trace, but being depressable against said switching trace;

said switch contact has a pair of laterally-spaced blades that generally extend at an upward incline and that have card-engaging locations that are positioned to be depressed by said card;

said switch beam has one end coupled to said blades to be depressed when said card-engaging locations on said blades are depressed, with said beam location lying sufficiently below said card-engaging locations of said blades, so said beam location lies below said blade locations even when said beam location engages said switching trace.

* * * * *